(12) United States Patent
Klassen (10) Patent No.: US 7,719,716 B2
(45) Date of Patent: May 18, 2010

(54) SCANNER CHARACTERIZATION FOR PRINTER CALIBRATION

(75) Inventor: R. Victor Klassen, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 813 days.

(21) Appl. No.: 11/593,410

(22) Filed: Nov. 6, 2006

(65) Prior Publication Data

US 2007/0103707 A1    May 10, 2007

Related U.S. Application Data

(60) Provisional application No. 60/733,467, filed on Nov. 4, 2005.

(51) Int. Cl.
*G06K 15/00* (2006.01)
*G06K 9/00* (2006.01)

(52) U.S. Cl. .................. 358/2.1; 358/1.6; 358/1.9; 382/162

(58) Field of Classification Search .......... 358/1.6, 358/1.9, 2.1, 3.27, 500, 504, 518, 516, 530; 382/162, 167, 254, 165
See application file for complete search history.

(56) References Cited

U.S. PATENT DOCUMENTS

| | | | |
|---|---|---|---|
| 4,473,298 A | 9/1984 | Sakamoto | |
| 4,516,175 A | 5/1985 | Jung et al. | |
| 4,579,446 A | 4/1986 | Fujino et al. | |
| 4,587,532 A | 5/1986 | Asano | |
| 4,836,119 A | 6/1989 | Siraco et al. | |
| 5,004,222 A | 4/1991 | Dobashi | |
| 5,080,340 A | 1/1992 | Hacknauer et al. | |
| 5,095,342 A | 3/1992 | Farrell et al. | |
| 5,159,395 A | 10/1992 | Farrell et al. | |
| 5,208,640 A | 5/1993 | Horie et al. | |
| 5,272,511 A | 12/1993 | Conrad et al. | |
| 5,326,093 A | 7/1994 | Sollitt | |
| 5,435,544 A | 7/1995 | Mandel | |
| 5,473,419 A | 12/1995 | Russel et al. | |
| 5,489,969 A | 2/1996 | Soler et al. | |
| 5,504,568 A | 4/1996 | Saraswat et al. | |
| 5,525,031 A | 6/1996 | Fox | |
| 5,557,367 A | 9/1996 | Yang et al. | |
| 5,568,246 A | 10/1996 | Keller et al. | |
| 5,570,172 A | 10/1996 | Acquaviva | |

(Continued)

OTHER PUBLICATIONS

Morgan, P.F., "Integration of Black Only and Color Printers", Xerox Disclosure Journal, vol. 16, No. 6, Nov./Dec. 1991, pp. 381-383.

(Continued)

*Primary Examiner*—Jerome Grant, II
(74) *Attorney, Agent, or Firm*—Fay Sharpe LLP (57) ABSTRACT

Colors similar to those which would be used in calibrating a target printer are printed on a printer of the same model and with the same materials set as anticipated for the printer calibration. These all lie within a substantially reduced portion of the gamuts of both the printer and scanner. A scanner characterization is derived only for those portions of color space corresponding to the printed colors. This may be done using spline fitting in one or more dimensions. While generic scanner calibrations generally have errors in excess of ΔE=7, with these techniques values generally less than 1.7 were obtained. This is sufficient for printer calibration.

20 Claims, 3 Drawing Sheets

U.S. PATENT DOCUMENTS

| | | | |
|---|---|---|---|
| 5,596,416 | A | 1/1997 | Barry et al. |
| 5,629,762 | A | 5/1997 | Mahoney et al. |
| 5,710,968 | A | 1/1998 | Clark et al. |
| 5,748,330 | A | 5/1998 | Wang et al. |
| 5,778,377 | A | 7/1998 | Marlin et al. |
| 5,784,667 | A | 7/1998 | Mestha et al. |
| 5,790,281 | A | 8/1998 | Knox et al. |
| 5,884,910 | A | 3/1999 | Mandel |
| 5,995,721 | A | 11/1999 | Rourke et al. |
| 6,059,284 | A | 5/2000 | Wolf et al. |
| 6,125,248 | A | 9/2000 | Moser |
| 6,241,242 | B1 | 6/2001 | Munro |
| 6,297,886 | B1 | 10/2001 | Cornell |
| 6,341,773 | B1 | 1/2002 | Aprato et al. |
| 6,345,117 | B2 | 2/2002 | Klassen |
| 6,384,918 | B1 | 5/2002 | Hubble, III et al. |
| 6,441,923 | B1 | 8/2002 | Balasubramanian et al. |
| 6,450,711 | B1 | 9/2002 | Conrow |
| 6,476,376 | B1 | 11/2002 | Biegelsen et al. |
| 6,476,923 | B1 | 11/2002 | Cornell |
| 6,493,098 | B1 | 12/2002 | Cornell |
| 6,537,910 | B1 | 3/2003 | Burke et al. |
| 6,550,762 | B2 | 4/2003 | Stoll |
| 6,554,276 | B2 | 4/2003 | Jackson et al. |
| 6,577,925 | B1 | 6/2003 | Fromherz |
| 6,607,320 | B2 | 8/2003 | Bobrow et al. |
| 6,608,988 | B2 | 8/2003 | Conrow |
| 6,612,566 | B2 | 9/2003 | Stoll |
| 6,612,571 | B2 | 9/2003 | Rider |
| 6,621,576 | B2 | 9/2003 | Tandon et al. |
| 6,633,382 | B2 | 10/2003 | Hubble, III et al. |
| 6,639,669 | B2 | 10/2003 | Hubble, III et al. |
| 6,760,056 | B2 | 7/2004 | Klassen et al. |
| 6,775,029 | B1 | 8/2004 | Wen et al. |
| 6,819,906 | B1 | 11/2004 | Herrmann et al. |
| 6,925,283 | B1 | 8/2005 | Mandel et al. |
| 6,959,165 | B2 | 10/2005 | Mandel et al. |
| 2001/0033686 | A1 | 10/2001 | Klassen |
| 2002/0031258 | A1* | 3/2002 | Namikata ............... 382/165 |
| 2002/0051158 | A1* | 5/2002 | Ohkubo .................. 358/1.9 |
| 2002/0067849 | A1 | 6/2002 | Klassen et al. |
| 2002/0078012 | A1 | 6/2002 | Ryan et al. |
| 2002/0103559 | A1 | 8/2002 | Gartstein |
| 2003/0063302 | A1 | 4/2003 | Munger et al. |
| 2003/0077095 | A1 | 4/2003 | Conrow |
| 2004/0085561 | A1 | 5/2004 | Fromherz |
| 2004/0085562 | A1 | 5/2004 | Fromherz |
| 2004/0088207 | A1 | 5/2004 | Fromherz |
| 2004/0136015 | A1 | 7/2004 | Van de Capelle et al. |
| 2004/0150156 | A1 | 8/2004 | Fromherz et al. |
| 2004/0150158 | A1 | 8/2004 | Biegelsen et al. |
| 2004/0153983 | A1 | 8/2004 | McMillan |
| 2004/0165199 | A1 | 8/2004 | Klassen et al. |
| 2004/0216002 | A1 | 10/2004 | Fromherz et al. |
| 2004/0225391 | A1 | 11/2004 | Fromherz et al. |
| 2004/0225394 | A1 | 11/2004 | Fromherz et al. |
| 2004/0246528 | A1 | 12/2004 | Washio et al. |
| 2004/0247365 | A1 | 12/2004 | Lofthus et al. |
| 2004/0252905 | A1 | 12/2004 | Mizes et al. |
| 2004/0257595 | A1 | 12/2004 | Sharma et al. |
| 2004/0264768 | A1 | 12/2004 | Sharma et al. |
| 2004/0264769 | A1 | 12/2004 | Sharma et al. |
| 2004/0264770 | A1 | 12/2004 | Sharma et al. |
| 2004/0264771 | A1 | 12/2004 | Sharma et al. |
| 2005/0036159 | A1 | 2/2005 | Sharma et al. |
| 2007/0091138 | A1* | 4/2007 | Hersch et al. ............ 347/19 |
| 2007/0223810 | A1* | 9/2007 | Sekine ..................... 382/162 |

OTHER PUBLICATIONS

Desmond Fretz, "Cluster Printing Solution Announced", Today at Xerox (TAX), No. 1129, Aug. 3, 2001.

Keith Knox, "Integrating Cavity Effect in Scanners," Proceedings on IS&T/OSA Conference on Optics and Imaging in the Information Age, Rochester, pp. 156-158, Dec. 1996.

G. Sharma, S. Wang, D. Sidavanahalli and K. Knox, "The Impact of UCR on Scanner Calibration," in Proc PICS Conf., pp. 121-124, Portland, OR, Dec. 1998.

V. Ostromoukhov, R.D. Hersch, C. Peraire, P. Emmel and I. Amidror, "Two Approaches in Scanner-Printer Calibration: Colorimetric Space-Based vs. Closed-Loop," in Proc SPIE 2170, pp. 133-142, Dec. 1994.

J. Hardeberg, "Desktop Scanning to sRGB," in IS&T and SPIE's Device Independent Color, Color Hardcopy and Graphic Arts V, San Jose, CA (Jan. 2000).

H. Haneishi, T. Hirao, A. Shimazu and Y. Miyake, "Colorimetric Precision in Scanner Calibration Using Matrices," in Proceedings of IS&T and SID'S $3^{rd}$ Color Imaging Conference: Color Science, Systems and Applications, pp. 106-108, Scottsdale, Arizona (Nov. 1995).

A.R. Rao, "Color Calibration of a Colorimetric Scanner Using Non-Linear Least Squares," in Proc. IS&T's 1998 PICS Conference, Portland, OR (May 1998).

J. Hardeberg, "Acquisition and Reproduction of Colour Images: Colorimetric and Multispectral Approaches," Doctoral Dissertation, l'Ecole Nationale Superieure des Telecommunications, Paris, Dec. 1999.

U.S. Appl. No. 10/761,522, filed Jan. 21, 2004, Mandel, et al.
U.S. Appl. No. 10/785,211, filed Feb. 24, 2004, Lofthus, et al.
U.S. Appl. No. 10/881,619, filed Jun. 30, 2004, Bobrow.
U.S. Appl. No. 10/917,676, filed Aug. 13, 2004, Lofthus, et al.
U.S. Appl. No. 10/917,768, filed Aug. 13, 2004, Lofthus, et al.
U.S. Appl. No. 10/924,106, filed Aug. 23, 2004, Lofthus, et al.
U.S. Appl. No. 10/924,113, filed Aug. 23, 2004, deJong, et al.
U.S. Appl. No. 10/924,458, filed Aug. 23, 2004, Lofthus, et al.
U.S. Appl. No. 10/924,459, filed Aug. 23, 2004, Mandel, et al.
U.S. Appl. No. 10/933,556, filed Sep. 3, 2004, Spencer, et al.
U.S. Appl. No. 10/953,953, filed Sep. 29, 2004, Radulski, et al.
U.S. Appl. No. 10/999,326, filed Nov. 30, 2004, Grace, et al.
U.S. Appl. No. 10/999,450, filed Nov. 30, 2004, Lofthus, et al.
U.S. Appl. No. 11/000,158, filed Nov. 30, 2004, Roof.
U.S. Appl. No. 11/000,168, filed Nov. 30, 2004, Biegelsen, et al.
U.S. Appl. No. 11/000,258, filed Nov. 30, 2004, Roof.
U.S. Appl. No. 11/001,890, filed Dec. 2, 2004, Lofthus, et al.
U.S. Appl. No. 11/002,528, filed Dec. 2, 2004, Lofthus, et al.
U.S. Appl. No. 11/051,817, filed Feb. 4, 2005, Moore, et al.
U.S. Appl. No. 11/070,681, filed Mar. 2, 2005, Viturro, et al.
U.S. Appl. No. 11/081,473, filed Mar. 16, 2005, Moore.
U.S. Appl. No. 11/069,020, filed Feb. 28, 2005, Lofthus, et al.
U.S. Appl. No. 11/089,854, filed Mar. 25, 2005, Clark, et al.
U.S. Appl. No. 11/090,498, filed Mar. 25, 2005, Clark.
U.S. Appl. No. 11/090,502, filed Mar. 25, 2005, Mongeon.
U.S. Appl. No. 11/095,378, filed Mar. 31, 2005, Moore, et al.
U.S. Appl. No. 11/094,998, filed Mar. 31, 2005, Moore, et al.
U.S. Appl. No. 11/094,864, filed Mar. 31, 2005, de Jong, et al.
U.S. Appl. No. 11/095,872, filed Mar. 31, 2005, Julien, et al.
U.S. Appl. No. 11/102,355, filed Apr. 8, 2005, Fromherz, et al.
U.S. Appl. No. 11/084,280, filed Mar. 18, 2005, Mizes.
U.S. Appl. No. 11/109,566, filed Apr. 19, 2005, Mandel, et al.
U.S. Appl. No. 11/109,558, filed Apr. 19, 2005, Furst, et al.
U.S. Appl. No. 11/109,996, filed Apr. 20, 2005, Mongeon, et al.
U.S. Appl. No. 11/093,229, filed Mar. 29, 2005, Julien.
U.S. Appl. No. 11/102,899, filed Apr. 8, 2005, Crawford, et al.
U.S. Appl. No. 11/102,910, filed Apr. 8, 2005, Crawford, et al.
U.S. Appl. No. 11/115,766, filed Apr. 27, 2005, Grace.
U.S. Appl. No. 11/102,332, filed Apr. 8, 2005, Hindi, et al.
U.S. Appl. No. 11/136,959, filed May 25, 2005, German, et al.
U.S. Appl. No. 11/136,821, filed May 25, 2005, Robinson.
U.S. Appl. No. 11/122,420, filed May 5, 2005, Richards.

U.S. Appl. No. 11/137,634, filed May 25, 2005, Lofthus, et al.
U.S. Appl. No. 11/137,251, filed May 25, 2005, Lofthus, et al.
U.S. Appl. No. 11/137,273, filed May 25, 2005, Anderson, et al.
U.S. Appl. No. 10/945,600, filed Sep. 20, 2004, Yao.
U.S. Appl. No. 11/143,818, filed Jun. 2, 2005, Dalal et al.
U.S. Appl. No. 11/146,665, filed Jun. 7, 2005, Mongeon.
U.S. Appl. No. 11/152,275, filed Jun. 14, 2005, Roof et al.
U.S. Appl. No. 11/156,778, filed Jun. 20, 2005, Swift.
U.S. Appl. No. 11/157,598, filed Jun. 21, 2005, Frankel.
U.S. Appl. No. 11/166,299, filed Jun. 24, 2005, Moore.
U.S. Appl. No. 11/166,460, filed Jun. 24, 2005, Roof et al.
U.S. Appl. No. 11/166,581, filed Jun. 24, 2005, Lang et al.
U.S. Appl. No. 11/170,845, filed Jun. 30, 2005, Sampath et al.
U.S. Appl. No. 11/189,371, filed Jul. 26, 2005, Moore et al.
U.S. Appl. No. 11/208,871, filed Aug. 22, 2005, Dalal et al.
U.S. Appl. No. 11/212,367, filed Aug. 26, 2005, Anderson et al.
U.S. Appl. No. 11/215,791, filed Aug. 30, 2005, Hamby et al.
U.S. Appl. No. 11/222,260, filed Sep. 8, 2005, Goodman et al.
U.S. Appl. No. 11/234,468, filed Sep. 23, 2005, Hamby et al.
U.S. Appl. No. 11/234,553, filed Sep. 23, 2005, Mongeon.
U.S. Appl. No. 11/235,979, filed Sep. 27, 2005, Anderson et al.
U.S. Appl. No. 11/236,099, filed Sep. 27, 2005, Anderson et al.
U.S. Appl. No. 11/247,778, filed Oct. 11, 2005, Radulski et al.
U.S. Appl. No. 11/248,044, filed Oct. 12, 2005, Spencer et al.
U.S. Appl. No. 11/170,873, filed Jun. 30, 2005, Klassen.
U.S. Appl. No. 11/274,638, filed Nov. 15, 2005, Wu et al.
U.S. Appl. No. 11/287,177, filed Nov. 23, 2005, Mandel et al.
U.S. Appl. No. 11/291,860, filed Nov. 30, 2005, Willis.
U.S. Appl. No. 11/292,163, filed Nov. 30, 2005, Mandel et al.
U.S. Appl. No. 11/292,388, filed Nov. 30, 2005, Mueller.
U.S. Appl. No. 11/314,774, filed Dec. 21, 2005, Klassen.
U.S. Appl. No. 11/315,045, filed Dec. 22, 2005, Klassen.
U.S. Appl. No. 11/268,294, filed Nov. 6, 2006, Klassen.
U.S. Appl. No. 11/170,975, filed Jun. 30, 2005, Klassen.

* cited by examiner

SCANNER CHARACTERIZATION FOR PRINTER CALIBRATION

This application is based on and claims priority to U.S. Provisional Application Ser. No. 60/733,467, filed Nov. 4, 2005, which application is hereby incorporated herein by reference in its entirety.

BACKGROUND

Scanner characterization traditionally suffers from a compromise between very data intensive fitting or simplified model based characterization with less accuracy than is desired for using the scanner for subsequent printer calibration. The emphasis on scanner calibration in the past was calibration for unknown inputs—either unknown grey component replacement strategy or unknown input media. This meant that the calibration was an attempt to do well in a larger domain of inputs, rather than doing very well in a restricted domain.

To characterize a scanner for printer calibration, typically a number of patches of various colors are printed, measured with a known instrument (such as a spectrophotometer), scanned and patch averages are computed.

The usual goal of scanner characterization is to obtain the best possible result when scanning pages of unknown origin. Such pages may or may not be halftones, and they typically contain image content, rather than simple collections of constant patches. Lack of information regarding paper color (and fluorescence) and colorant materials limits the quality of such characterizations.

Sharma et al., G. Sharma, S. Wang, D. Sidavanahalli and K. Knox "The impact of UCR on scanner calibration", in *Proc PICS Conf.*, pp. 121-124, Portland, Oreg. (1998) describe the impact an unknown amount of black substitution can have on scanner characterization. In the worst case, they found errors as high as 4.5 (mean $\Delta E$), while when it was fully known, mean errors dropped below 1.2. When calibrating printers, there is generally no black substitution. It suffices to characterize the scanner for this case.

Many others have characterized scanners. Ostromoukhov et al., V. Ostromoukhov, R. D. Hersch, C. Péraire, P. Emmel, I. Amidror, "Two approaches in scanner-printer calibration: calorimetric space-based vs. closed-loop", in *Proc SPIE* 2170, pp. 133-142(1994) obtained results of 2.37 (mean $\Delta E$). One reason for their poorer results is that the printer was a desktop inkjet printer, with more noise and lower stability than the Xerographic printer used by Sharma et al. They noted neighborhood effects, and attempted to reduce their impact by using large patches. This may give incorrect results. Hardeberg, J. Hardeberg, "Desktop Scanning to sRGB" in IS&T and SPIE's Device Independent Color, Color Hardcopy and Graphic Arts V, San Jose, Calif. (January 2000), optimized a third order (3×20) matrix, obtaining $\Delta E$ 1.4 on two scanners, with less good results on others. Previously, Haneishi et al., H. Haneishi, T. Hirao, A. Shimazu, and Y. Miyake, "Colorimetric precision in scanner calibration using matrices", in *Proceedings of IS&T and SID'S $3^{rd}$ Color Imaging Conference: Color Science, Systems and Applications*, pp. 106-108, Scottsdale, Ariz. (November 1995), had obtained $\Delta E$=2 using a second (3×10) matrix regression. Rao, A. R. Rao, "Color calibration of a colorimetric scanner using non-linear least squares", in *Proc. IS&T's* 1998 *PICS Conference*, Portland, Oreg. (May 1998), obtained similar values. Hardeberg's thesis, J. Hardeberg, *Acquisition and Reproduction of Colour Images: Colorimetric and Multispectral Approaches*, Doctoral Dissertation, l'Ecole Nationale Supérieure des Télécommunications (Paris 1999), describes an experiment (p. 37ff.) in which a single scanner is characterized with a mean $\Delta E$ of 0.92, a max of 4.67 and a $95^{th}$ percentile of 2.25 on a set of 288 patches (the same set used to calibrate). He also characterized and tested on (disjoint) subsets (p. 51), and found that when he used 144 patches to train, and the other 144 to test, the mean $\Delta E$ rose to 0.96, but the max (of the test set) fell to 3.36 (the max $\Delta E$ for the training set was higher, at 3.9).

Because scanners are not colorimetric, they may exhibit metamerism: colors that appear identical to a scanner might appear different to a human observer. For fixed media and black substitution strategy metamerism is not a problem. However, the conversion from RGB to XYZ various throughout color space. As compensation, scanners may measure far more patches per minute than spectrophotometers inasmuch as we can afford to sample color space substantially more densely.

The only difference between characterizing a scanner for printer calibration and characterizing it for arbitrary prints from that printer is the sampling of color space. While there is no need to characterize the scanner in regions of color space which are not used for printer calibration, all regions are typically sampled in the more general case.

By way of background, methods of printer calibration are described, with particular reference to the portions of color space they each seek to control.

One type of printer calibration involves $\Delta E$ from paper. For this printer calibration, a step wedge in each separation is used. In better implementations, the step wedge is linear in $\Delta E$ distance from paper, as predicted by the previous calibration. As a result, we cannot predict exactly which color will be needed but we can say they will be along the CMYK axes. These axes do not (exactly) run along lines in L*a*b* space, but they are confined to space curves, which stay relatively fixed. That is, it is sufficient to be able to estimate the location along the curve, and ignore any deviation from the curve. What matters is the ability of the measuring device (in this case a scanner) to detect small changes along that line.

Another type of printer calibration uses Grey Balance Tone Reproduction Curves (TRC). For this calibration, patches surrounding the presumed neutral axis are printed and measured, in order to find a better approximation of the location of the neutral axis. The neutral axis is then divided into equal increments along L* and CMY points along that axis define the TRCs. The neutral axis does not generally go to the full CMY point, as one of the three defines the limit of the CMY neutral. The others are then smoothly carried out to their limits. The procedure normally begins with a good estimate of the printer response, from a combination of a full characterization and any previous grey balance calibrations. The refinement is only CMY patches close to the neutral axis. A separate $\Delta E$ from paper TRC is built for the black separation.

In terms of being able to do a grey balance TRC with a scanner, the issue is how well can the scanner be calibrated near the neutral axis, and, once calibrated, how sensitive is it to small changes in both lightness along the axis and changes perpendicular to the axis.

Another type of printer calibration uses a two-dimensional tone reproduction curve (TRC). In this version, there are three two dimensional tables built, for CMY space. One maps from (C, M+Y) to C', another from (M, C+Y) to M', and the third from (Y, C+M) to Y'. Considering only the first one, the table is built with $\Delta E$ from paper along the M+Y=0 axis, grey balance along the line C=(M+Y)/2, $\Delta E$ from red along the line from white to red, $\Delta E$ from red along the line from red to black, and $\Delta E$ from cyan along the line from cyan to black. One other line is typically controlled, using a compromise between ΔE from paper to blue and to green along the line from (0,0) to (0,1). Similar lines are controlled for the other two tables. This means that the following lines through color space are controlled: paper to C, M, Y, R, G, B; paper to CMY; CMY to C, M, Y, R, G and B; paper to K. Many of these are lines that were controlled in one of the prior two calibrations. The new lines are all controlled in a one-dimensional sense, just as for the ΔE from paper calibration, so again, the only thing that substantially matters for them is the scanner response to small changes along a curve, and not orthogonal to the curve.

Still another type of printer calibration involves a three-dimensional tone reproduction curve (TRC). In this version, all of color space is sampled, but coarsely. That is, a relatively coarse grid in CMY space is used to obtain a 3D correction function. If, e.g. a 7×7×7 grid of CMY points is used to calibrate the printer, it is colors in the neighborhood of those 343 patches that matter.

CROSS REFERENCE TO RELATED PATENTS AND APPLICATIONS

This application is related to U.S. application Ser. No. 11/170,873, filed on Jun. 30, 2005, entitled COLOR CHARACTERIZATION OR CALIBRATION TARGETS WITH NOISE-DEPENDENT PATCH SIZE OR NUMBER, by R. Victor Klassen and U.S. application Ser. No. 11/170,975, filed on Jun. 30, 2005, entitled METHOD AND SYSTEM FOR PROCESSING SCANNED PATCHES FOR USE IN IMAGING DEVICE CALIBRATION, by R. Victor Klassen, and, U.S. application Ser. No. 11/268,294, filed on Nov. 4, 2005, entitled A METHOD FOR CORRECTING INTEGRATING CAVITY EFFECT FOR CALIBRATION AND/OR CHARACTERIZATION TARGETS by R. Victor Klassen, all of which are incorporated herein by reference in their entirety.

BRIEF DESCRIPTION

In accord with the presently described embodiments, in one form, colors similar to those which would be used in calibrating a target printer are printed on a printer of the same model and with the same materials set as anticipated for the printer calibration. These all lie within a substantially reduced portion of the gamuts of both the printer and scanner. A scanner characterization is derived only for those portions of color space corresponding to the printed colors. This may be done using spline fitting in one or more dimensions. While generic scanner calibrations generally have errors in excess of ΔE=7, with these techniques values generally less than 1.7 were obtained. This is sufficient for printer calibration.

In this regard, in one aspect of the presently described embodiments, the method comprises determining regions of a color space to be printed by the printer, printing color patches, by the printer, corresponding to the determined regions of the color space, scanning the color patches with the scanner, measuring device—independent color values for each patch calculating reflectance values for each patch, and, computing a scanner characterization function based on the reflectance values.

In another aspect of the presently described embodiments, the measuring comprises using a spectrophotometer.

In another aspect of the presently described, embodiments, the determining comprises selecting colors in a region of color space required in a later printer calibration.

In another aspect of the presently described embodiments, the later printer calibration comprises ΔE from paper calibration.

In another aspect of the presently described embodiments, the later printer calibration comprises grey balance calibration.

In another aspect of the presently described embodiments, the later printer calibration comprises two-dimensional calibration.

In another aspect of the presently described embodiments, the later printer calibration comprises three-dimensional table look-up calibration.

In another aspect of the presently described embodiments, the determined regions are locations on a grid.

In another aspect of the presently described embodiments, the characterization function is comprised of multiple independent characterizations.

In another aspect of the presently described embodiments, the characterization function is selected from among the multiple independent characterization functions based on the printed color to be converted.

In another aspect of the presently described embodiments, means are provided to implement the method.

DETAILED DESCRIPTION

As noted above, there are currently practiced at least four methods of printer calibration: ΔE from paper TRC, Grey-balance TRC, 2D TRC and 3D LUT+K TRC.

According to the presently described embodiments, a scanner's response is characterized in only that portion of color space needed for such printer color calibration. By limiting the region for which the characterization is valid, higher precision is possible with a reasonable number of measurements.

Figure 1:
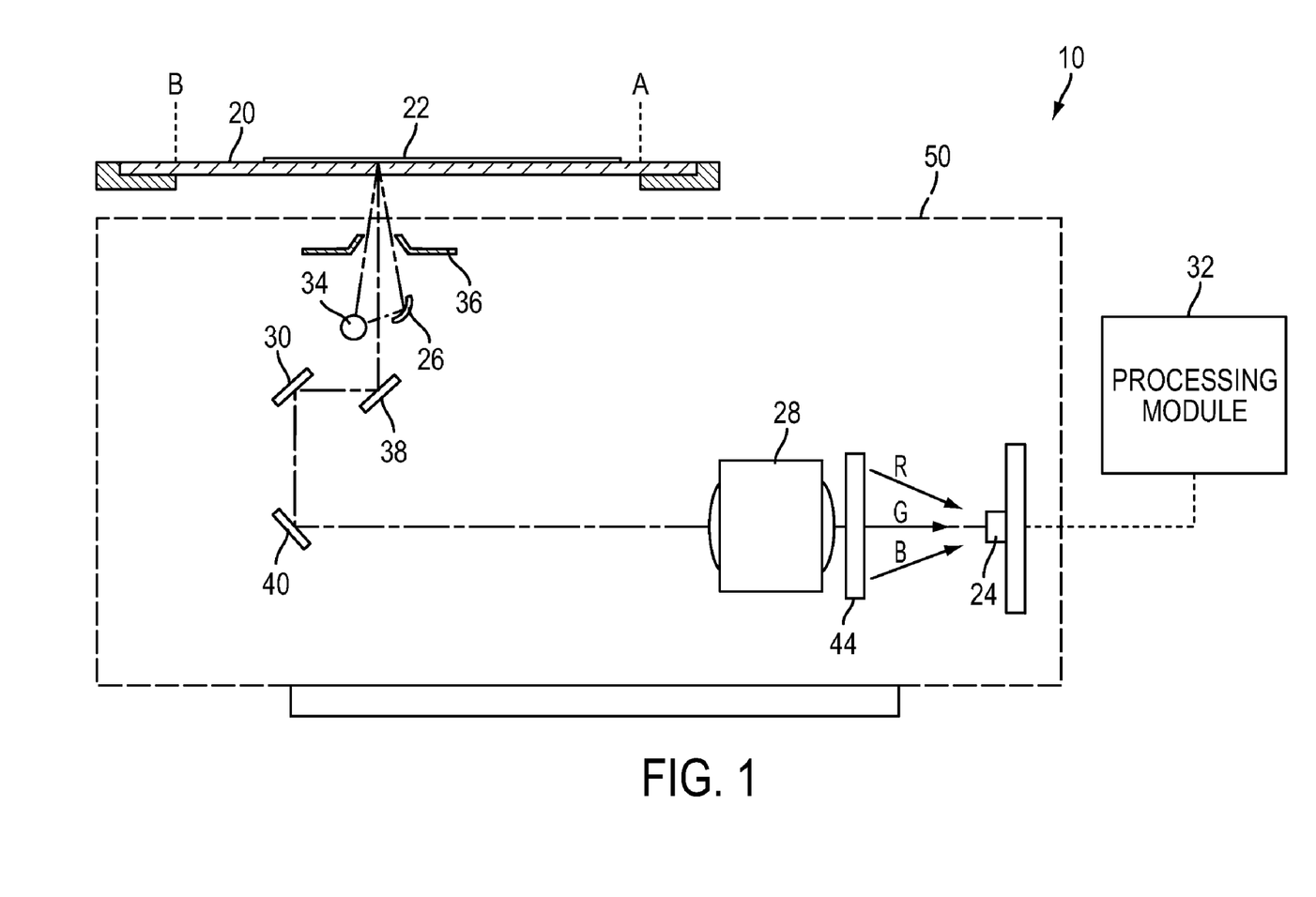
FIG. 1 is an illustration of a scanner to which the presently described embodiments may be applied.

To illustrate, referring now to the drawings where the showings are for the purpose of describing an embodiment of the invention and not for limiting same, FIG. 1 represents one possible embodiment of a desktop scanner having an image acquisition device which may be used with the presently described embodiments. Although the presently described embodiments are described in conjunction with a desktop scanner, it may be possible to adapt it for use with other image acquisition devices, and the presently described embodiments are not limited to these embodiments. For example, it may be implemented with a scanner that is closely associated with a printing system.

Referring to FIG. 1, a desktop scanner 10 incorporates a transparent platen 20 on which a document 22 to be scanned is located. One or more photosensitive linear arrays 24 are supported for reciprocating scanning movement below platen 20. A scanning system assembly includes several optical components which move together as a single unit. These typically include a fluorescent lamp 34, an associated reflector 26 and a baffle 36, with the latter two elements cooperating to direct a narrow band of light onto a small area across the platen. Also included in the assembly are lens 28, and mirrors 30, 38 and 40, which operate together to focus the illuminated segment of platen 20 and the document being scanned thereon, onto array 24. Array 24 produces image signals or pixels representative of the image present on the surface of document 22. These pixels are output to a display or storage device. The entire scanning system assembly is enclosed by cavity 50. Also shown is a processing module 32 in communication with the array 24. The processing module 32 may take a variety of suitable forms and may reside within the cavity 50 or outside the cavity 50. Further, the processing module 32 may be incorporated within the scanner or may reside on a system controlling the scanner.

Scanning array 24 may be a linear array of photosensitive sensors such as CCD's or photodiodes which are controlled to sense light reflected from a document during the illumination period. The photosensitive sensors develop a charge indicative of the amount of light detected, for transmission to an image processor for use in assimilating an electronically stored representation of image contained in document 22. Scanning array 24 extends in a direction transverse to that of the motion of the carriage. This enables the carriage to move along an axis known to those skilled in the art as the "slow scan" axis, which begins at one end of the image and extends in the process direction towards the opposite end. The direction across the page in which the array extends is known as the fast scan axis.

Color imaging is typically performed using various combinations of colors, most often three colors red, green and blue. The color sensor 44 includes one filter for each color that will be used by the device for generating images. Thus, once the light from lamp 34 passes through lens 28, it will reach color sensor 44, where it will be filtered into the separate color sources.

In order to use the scanner as a surrogate for a spectrophotometer it is necessary to correct raw scanner response to scanner-weighted reflectance and average the pixels within a window. Any outliers may also be removed at this stage. A process for doing so is described in U.S. patent application Ser. No. 11/170,975, entitled "METHOD AND SYSTEM FOR PROCESSING SCANNED PATCHES FOR USE IN IMAGING DEVICE CALIBRATION", filed Jun. 30, 2005, the disclosure of which is incorporated herein by reference in its entirety. Given a method of converting from a scanned patch on a page to a mean reflectance in each of red, green and blue (or possibly more channels), an objective is to select patches to print, and use their mean reflectances to compute a scanner characterization function.

Scanner-weighted reflectance is the closest surrogate to reflectance one can measure with a given scanner. While true reflectance is a function of wavelength, scanner-weighted reflectance is the result of taking weighted averages of the spectral reflectances, where the weights are implicitly defined by the filters used in separating the (typically red, green and blue) channels of the scanner. For simplicity, the term "reflectance" will be used for "scanner-weighted reflectance" with the understanding that it refers to a corrected response from one of the scanner's channels, and not an actual spectral reflectance. It is expected that the reflectance, as corrected, is equal to the actual reflectance as reported by a spectrophotometer, when a neutral grey of flat spectral response is measured or scanned.

Figure 2:
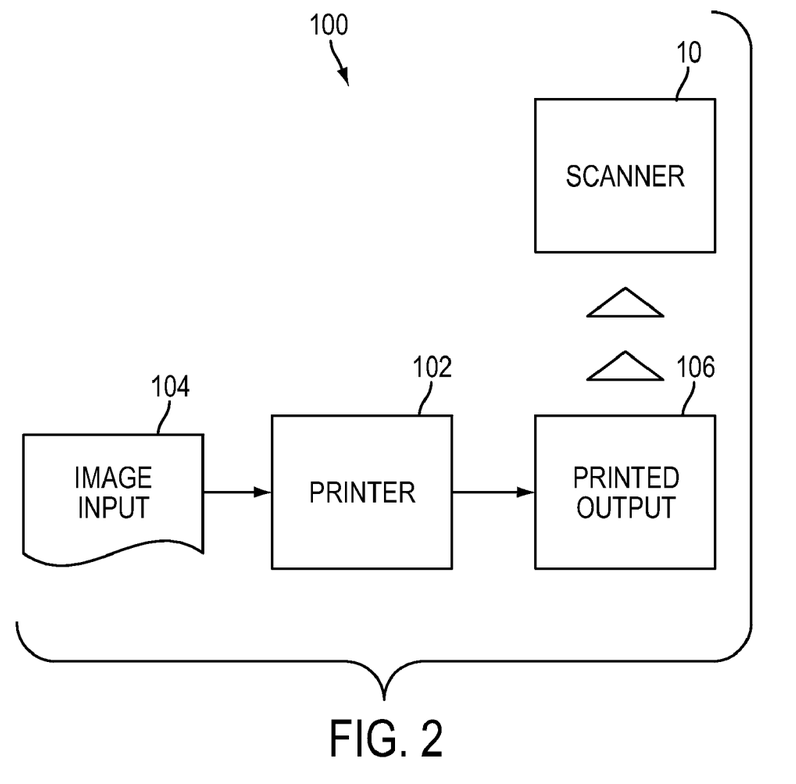
FIG. 2 is an illustration of a system to which the presently described embodiments may be applied; and, FIG. 3 is a flow chart according to the presently described embodiments.

To illustrate, in an example implementation of the presently described embodiments, with reference to FIG. 2, a system 100 is shown. The system 100 includes the scanner 10, as more particularly described in connection with FIG. 1. The system 100 also includes a printer 102. The printer 102 may take a variety of forms that are well known. Printer 102, in one form, includes a print engine and associated components that utilize color spaces which can be analyzed in accord with the objectives of the presently described embodiments. In this regard, the scanner 10 is characterized based on the color space used by the printer 102. It should also be noted that the printer 102 will typically handle an image input 104 which will be suitably processed by the printer 102 to obtain a printed output 106. The output 106, in one form, is then used by the scanner for characterization purposes in accord with the techniques of the presently described embodiments.

Figure 3:
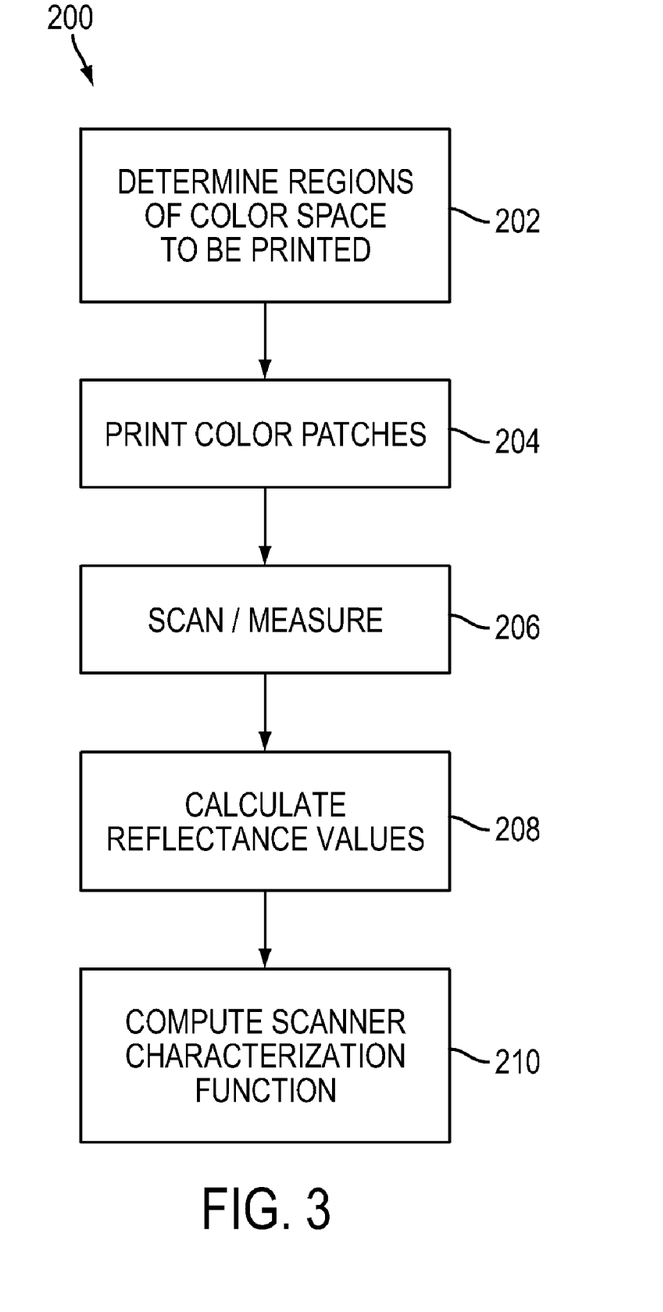

With reference now to FIG. 3, a method 200 according to the presently described embodiments is illustrated. It should be appreciated that methods, including method 200, according to the presently described embodiments may be implemented in a variety of manners. For example, a variety of hardware configurations and software techniques may be implemented to realize the objectives of the presently described embodiments. For example, printing functions (e.g., at 202, 204) of the method may be carried out by the printer 102 while scanning and other processing functions (e.g., 206, 208, 210) of the method will be carried out by the scanner 10 and its associated processing module 32. In this regard, suitable software routines may be housed and processed by module 32. In some forms, a spectrophotometer may be used to measure selected values, as illustrated below.

With reference back to FIG. 3, the method 200 includes determining the regions of color space to be printed (at 202). This determination, in at least one form, comprises selecting colors in a region of color space required in a later printer calibration, e.g., grey balance calibration, ΔE from paper calibration, two-dimensional calibration and/or three-dimensional table look-up calibration. Color patches corresponding to the determined regions of color space are then printed (at 204). This printed output (i.e., 106 of FIG. 2) is then scanned and measured (at 206). In one form, the scanning is carried out by the scanner 10 (of FIG. 2). Device-independent color values for each patch are then measured. A spectrophotometer may be used to do so. Reflectance values (e.g., $L^*a^*b^*$ values) for the patches are then calculated for each color channel (at 208). A scanner characterization function is then computed based on the reflectance values and the device-independent color values (at 210). The characterization functions may be comprised of multiple independent characterization functions. Further, the characterization function may be selected from the multiple independent characterization functions based on the printed color to be converted.

It should be understood that the calculation of reflectance values (e.g., at 208) for each color channel and the computation of scanner characterization (e.g., at 210) may be accomplished according to the presently described embodiments in a variety of manners. For example, the manner selected to accomplish these objectives may depend on the printer calibration methods that may ultimately be used for purposes of calibrating the printer 102.

So, in one embodiment, ΔE from paper is considered. In this case, there are four step wedges: one per printed separation. These may be printed at sufficient (e.g. 33 levels) resolution, scanned and converted to reflectance values. For each scanner channel (normally R,G,B), a space curve is fit mapping averaged R, G or B to measured $L^*$, $a^*$ and $b^*$. This provides three different parameterizations of what is the same space curve. One such space curve is found for each separation independently controlled (e.g. cyan, magenta, yellow and black).

To find $L^*a^*b^*$ values for a given input RGB, the closest point on the space curve corresponding to the appropriate printed color is found. Unless the point is actually on the curve (unlikely given measurement imprecision), the $L^*a^*b^*$ values given by the three curve representations will differ, since small errors in each of R, G, and B will each lead to different locations on the curve. As a result, a search mechanism is employed that minimizes the difference between the location in L*a*b* space and the three locations predicted by the R, G and B values, while staying on the curve. From the computed L*a*b* value, ΔE may be computed.

A B-spline curve with optimized knot locations has been found to work well for representing the space curve. If an approximate calibration of the printer exists, in terms of scanner RGB, the printed values can be chosen so as to provide an approximately even sampling of scanner RGB space along the curve going from white to full toner. Having the parameter space evenly sampled tends to improve the quality of the fit.

At this point there are three representations of the same curve through L*a*b* space, each with a different input parameter. Each point on the curve is a three dimensional point in L*a*b* space. The three curves together represent a mapping from (RGB) to (L*a*b*), but only for a single set of (RGB) points. For a given RGB triplet, there is the chance that the L*a*b* values corresponding to R will be the same as those corresponding to G, and to B. As long as only a single separation is measured to generate that RGB triplet and that is the same separation that was used to create the space curves, it is likely that the L*a*b* values corresponding to the three inputs will be close, but it is unlikely, given measurement noise, that they will be identical.

Therefore, to find L*a*b* values for a given input RGB, the closest point on the three space curves is found. That is, the three L*a*b* points on the respective R, G and B curves are found. For each of those three points, there exists an input parameter corresponding to the fraction of the way along the initial step wedge that that point is. These will in general be close to each other, but different. An optimization procedure attempts to find the parameter value where the difference between the RGB for that parameter value and the R, G, and B values measured is minimized, in a least squares sense. That is, each of the three points R, G and B corresponds to a parameter pr, pg, pb. Each of these parameters has associated with it an amount of all three separations, R, G and B. Some value of the parameter minimizes the squared sum of differences between its corresponding R, G and B and the RGB value read by the scanner. It is this value of the parameter that is then evaluated in computing the L*a*b* values of the measured patch, from which the ΔE from paper value is calculated.

In another embodiment, grey balance TRCs are used. Here the problem is three dimensional. Not only is it important to have uniform steps in lightness, it is possibly more important to confine those steps to the neutral axis.

Ideally, one would define a line from white to black, and print, measure and model a square prism through color space along that line. That is, for each of some number of points along the line, print a 5×5 grid of points at locations regularly spaced on a plane perpendicular to the line. This works for much of color space, but not for colors close to black or white. Suppose, one defines a (g,r,y) space, (for grey, red, yellow: note the use of lower case, as upper case R and G are already in use for Red and Green), based on the transformation of the CMY coordinates:

$g=(C+M+Y)/3$ $r=(M+Y-2C)/2$ $y=(2Y-M-C)/2$

Then, taking equal steps up the g axis takes one from white to black, along printer neutral. For any given value of g, two equal steps in each direction (positive and negative) away from the axis in each of r and y defines a 5×5 grid. Steps of ¹⁄₁₆ of the printer gamut appear sufficient to ensure that the actual neutral axis is contained within the modeled region. Unfortunately, some of these points are out of gamut. For example (0.0625, 0.125, 0.0) corresponds to C+M+Y=0.1875, M+Y−2C=0.25 and Y=(M+C)/2. Substituting the last into the other two:

M+C=0.125 and 3(M−C)=0.5; C=−¹⁄₄₈, which is physically impossible. Hence, only the realizable subset of this group of patches can be printed and measured.

The remaining ones may be extrapolated. Since it is not anticipated that colors far from the neutral axis will be printed and scanned, errors caused by extrapolation should have little effect on the result.

Once all of the patches are printed and measured, they may be defined in terms of 25 columns of values, parameterized by their g value. Each column may be fit to a single B spline curve (or another parametric form), and then from the parametric fit an extrapolation may be obtained to fill in the remaining points outside of the gamut. At any given level, the 25 splines may be evaluated to give a set of estimates of smoothed values at that level. From those smoothed values, a tensor product (single segment) B spline may be formed, allowing a smooth interpolation anywhere within the level. By evaluating the interpolating function within each level, new columns may be computed, which smoothly interpolate between the existing ones. Now there are two three dimensional functions of the parameters g,ry: one giving RGB as a function of gry, and another giving L*a*b* as a function of gry.

Defining yet another set of coordinates similar to gry, called g'r'y', in terms of RGB, based on the transformation R=1−C, G=1−M, B=1−Y, one may then form a regular, moderately finely sampled grid in g'r'y' space. A point in this new grid is populated by:

converting from its g'r'y' coordinates to RGB;
finding that RGB in the mapping from gry to RGB;
using the gry where the RGB was found; and
computing the corresponding L*a*b* by interpolation.

Once all of the patches are printed and measured, they may be fit to a single 3D B spline (or an other parametric form). This function gives a direct mapping from scanner GRY (the input parameter space) to printer L*a*b*. Using an input parameter space that aligns with the major axis of the data sample points leads to a much better fit, than say, attempting to do a fit from RGB to L*a*b*, when the input data is centered along the neutral axis.

Several manipulations are helpful in improving the fit:

1) Space the input (printed) data (approximately) uniformly through scanner GRY space. (This is naturally imperfect, as it requires a scanner characterization, which we are building).

2) Use Singular value decomposition to find the BSpline control vertex values.

3) Transform the scanned values into a more uniform, axis-aligned space before using them as parameters to fit the L*a*b* spline. That is, rotate their principal component axis to align with the g axis, and scale all three axes to fill space more uniformly.

4) Integrating cavity effect correction, as described in U.S. application Ser. No. 11/268,294 (Attorney Docket No. XERZ 2 00997), filed on Nov. 4, 2005, entitled A METHOD FOR CORRECTING INTEGRATING CAVITY EFFECT FOR CALIBRATION AND/OR CHARACTERIZATION TARGETS by R. Victor Klassen, the disclosure of which is incorporated herein by reference in its entirety, is recommended, prior to any data fitting.

5) Maximize the number of patches on the printed page: with 29 planes of patches rather than 24, a 30% improvement in the quality of fit was obtained.

In another embodiment, two-dimensional TRCs are used. The data for 2D methods is the same as the data for the two above methods combined, along with additional lines that are all controlled in a one-dimensional sense, analogous to $\Delta E$ from paper. Thus, the approach to characterizing the scanner for $\Delta E$ from paper applies to the new regions, while one of the above approaches applies to all the other regions. The overall characterization function combines the characterization functions of all the individual TRCs. When a given color is to be converted from scan values to device independent values, it is known to which region of (printer) color space that color belongs. A separate characterization function may be used for each such region, and selected based on the printed color to be converted.

While full characterization typically yields values of $\Delta E$ in excess of 7, this method has produced values less than 0.9, at the $95^{th}$ percentile. The maximum error was 1.8, and the mean was 0.3. The quality was measured by comparing the L*a*b* values of the input points, as measured using a spectrophotometer, to the L*a*b* values predicted, in the neutral axis fitting (single separation values tend to be somewhat better).

Hue Control Along Multiple-Separation Axes

When characterizing the scanner for printer calibration, measurement along the following lines may be had:
1) White to primaries
   a. White to magenta
   b. White to yellow
   d. (White to black)
2) White to Secondaries
   a. White to red
   b. White to green
   c. White to blue
3) White to black along the neutral axis, in a thick swath.
4) Black to primaries
   a. Black to cyan
   b. Black to magenta
   c. Black to yellow
5) Black to secondaries
   a. Black to red
   b. Black to green
   c. Black to blue The first group is then used for a $\Delta E$ from paper TRC for each of the respective primary colors. There is the implicit assumption that the locus of colors along which a tint of any primary can lie is fixed, and so any newly measured color made from such a tint will be within noise of this locus, and it is only along that locus that we measure and fit a curve to characterize the scanner.

The third group we attempt to sample broadly and densely enough that there is no issue of colors near C=M=Y will produce a color outside the gamut for which the scanner was characterized, and the fit to the characterization data should then take care of any near neutral we might measure.

The remaining groups are subject to variations in the printer, specifically in the ratio of separations that appear when more than one is requested, even though they are requested in equal amounts.

White to Secondaries

Taking the example of white to red, the primary source of variation is in the ratio of magenta to yellow along this line. Colors will generally stay very close to the "plane" defined by red, magenta, yellow and white, but may not stay along the line originally measured using equal amounts of requested magenta and yellow. There may be three one dimensional B splines running from white to red, (one each for L*, a* and b*). These are from white to printer red, not necessarily scanner red. Stepping (say) $\frac{1}{16}$ of the printer gamut toward magenta, we can measure along a second line, from Y=O, M=$\frac{1}{16}$ through Y=$\frac{15}{16}$, M=1. This line could be sampled at half the density of the original line from white to red. A second one dimensional set of B-splines can then be fit through these points. Similarly, we can measure a third line from M=O, Y=$\frac{1}{16}$ through M=$\frac{15}{16}$, Y=1, and fit a set of splines through it. Now, given these three splines, we can step at fairly frequent steps from one end to the other (e.g., like 128), and build a two-dimensional triangular mesh connecting fitted points in the three lines together. It should be safe to linearly extrapolate beyond the triangular mesh to the edges of the scanner gamut. Then, we can sample the scanner's space densely and build a rectangular mesh that is uniform in scanner RGB space, for fast searching.

This adds two new lines to measure (per separation), two new sets of curves to fit (each), and some post-processing to make it reasonably fast to find an L*a*b* value from a scan of a printed color along one of these lines.

Black to Primaries

Taking cyan as a representative primary, this is a case where cyan is held constant through the ramp and yellow and magenta are stepped from 0 to 1 in unison. This is perfectly analogous to the white to secondaries case, and can be handled in like fashion. It should be safe to assume that colors printed with full cyan will not wander much from the surface of the cube face, but may wander within the face as the ratio of yellow and magenta varies.

Black to Secondaries

Here a representative sample could be black to red. Cyan is varied along this line, while magenta and yellow are held fixed at their maxima. To first order, we can assume that magenta and yellow produce a constant red, and that never changes. To the extent that is a valid assumption, we need make no further measurements to accommodate these colors.

The second order assumption is that red moves about some. In that case, we can print and measure three parallel lines (again at lower resolution than the original line along the gamut edge). One line would be at Y=$\frac{15}{16}$, M=1, another at Y=1, M=$\frac{15}{16}$, and the third at Y=M=$\frac{15}{16}$. This would give us four fit curves along the edge of the gamut, and by sampling those fits we can put together a grid of points (2×2×n) along the edge. Here, n is the desired sampling resolution along the lines. We can further linearly extrapolate to $\frac{17}{16}$ to expand the grid to 3×3×n with the black to red line running up the middle of the grid. Then, when we measure a color purported to be along the black-red line, we can interpolate within this grid.

Using this approach would require an additional three lines times three secondaries, for nine more lines.

In still other embodiments, three-dimensional lookup tables are used. For three-dimensional lookup tables, patches at known locations throughout color space are printed in the calibration process. The scanner characterization should aim to maximize accuracy in the vicinity of each of those locations. For example, if the patches are arrayed on a uniform grid, the same grid could be used when the scanner is characterized. While the colors printed on a subsequent calibration will not be a perfect match, the scanner characterization will be better in those locations than (say) mid-way between the locations for which the scanner was characterized.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently. made by those skilled in the art which are also intended to be encompassed by the presently described embodiments.

The invention claimed is:

1. A method for characterizing a scanner associated with a printer, the method comprising:
   determining regions of a color space to be printed by the printer;
   printing color patches, by the printer, corresponding to the determined regions of the color space;
   scanning the color patches with the scanner;
   measuring device-independent color values for each patch;
   calculating reflectance values for each patch; and,
   computing a scanner characterization function based on the reflectance values and the device-independent color values.

2. The method as set forth in claim 1 wherein the measuring comprises using a spectrophotometer.

3. The method as set forth in claim 1 wherein the determining comprises selecting colors in a region of color space required in a later printer calibration.

4. The method as set forth in claim 3 wherein the later printer calibration comprises grey balance calibration.

5. The method as set forth in claim 3 wherein the later printer calibration comprises ΔE from paper calibration.

6. The method as set forth in claim 3 wherein the later printer calibration comprises two dimensional calibration.

7. The method as set forth in claim 3 wherein the later printer calibration comprises three dimensional lookup table based calibration.

8. The method as set forth in claim 7 wherein the determined regions are locations arrayed on a grid.

9. The method as set forth in claim 1 wherein the characterization function is comprised of multiple independent characterization functions.

10. The method of claim 8 wherein the characterization function is selected from among said multiple independent characterization functions based on the printed color to be converted.

11. A system for characterizing a scanner associated with a printer, the system comprising:
    means for determining regions of a color space to be printed;
    means for printing color patches, corresponding to the determined regions of the color space;
    means for scanning the color patches;
    means for measuring device-independent color values for each patch;
    means for calculating reflectance values for each patch; and,
    means for computing a scanner characterization function based on the reflectance values and the device-independent color values.

12. The system as set forth in claim 11 wherein the means for measuring comprises using a spectrophotometer.

13. The system as set forth in claim 11 wherein the means for determining comprises selecting colors in a region of color space required in a later printer calibration.

14. The system as set forth in claim 13 wherein the later printer calibration comprises grey balance calibration.

15. The system as set forth in claim 13 wherein the later printer calibration comprises ΔE from paper calibration.

16. The system as set forth in claim 13 wherein the later printer calibration comprises two dimensional calibration.

17. The system as set forth in claim 13 wherein the later printer calibration comprises three dimensional lookup table based calibration.

18. The system as set forth in claim 17 wherein the determined regions are locations arrayed on a grid.

19. The system as set forth in claim 11 wherein the characterization function is comprised of multiple independent characterization functions.

20. The system of claim 19 wherein the characterization function is selected from among said multiple independent characterization functions based on the printed color to be converted.

* * * * *